United States Patent [19]
Carlson

[11] 4,321,145
[45] Mar. 23, 1982

[54] ION EXCHANGE TREATMENT FOR REMOVING TOXIC METALS AND CYANIDE VALUES FROM WASTE WATERS

[76] Inventor: Lee G. Carlson, 8216 Crestview Dr., Willow Springs, Ill. 60480

[21] Appl. No.: 158,454

[22] Filed: Jun. 11, 1980

[51] Int. Cl.³ .............................................. B01J 47/04
[52] U.S. Cl. ................................... 210/678; 210/685; 210/177; 210/904; 422/234; 423/236; 423/371
[58] Field of Search ............... 55/53, 68, 196; 203/41; 210/664, 670, 673, 677, 678, 681, 683–685, 688, 904, 175, 177, 180–182, 188, 195.1, 205, 218, 221.1, 252, 259, 266, 269, 274, 275, 283, 290; 422/234; 423/236, 371, 194

[56] References Cited
U.S. PATENT DOCUMENTS

| | | | |
|---|---|---|---|
| 897,735 | 9/1908 | Goldberg | 210/904 |
| 3,359,199 | 12/1967 | Schmidt | 210/685 |
| 3,658,470 | 4/1972 | Zievers et al. | 210/684 |
| 3,719,591 | 3/1973 | Crits | 210/283 |
| 3,744,977 | 7/1973 | Scott | 422/234 |
| 3,984,314 | 10/1976 | Fries | 210/684 |

*Primary Examiner*—Ivars C. Cintins
*Attorney, Agent, or Firm*—Lockwood, Dewey, Alex & Cummings

[57] ABSTRACT

Ion exchange techniques are utilized to treat waste water flows, especially those from plating baths, by passing the waste water through a multi-level ion exchange resin bed, the bed thereafter being regenerated by a series of steps, including backwashing, passage of an acidic regeneration fluid through the bed, multistage rinsing of the bed, and passage of a caustic regeneration fluid through at least a portion of the bed. Acidic waste flows developed during regeneration steps are, when desired, further treated to recover cyanide values therefrom by heating same within a generally closed tank to drive off a hydrocyanic gas, which is then reacted with caustic within a circulation reactor having an inclined passageway in order to form and recover a cyanide salt liquor suitable for re-use in the plating bath.

32 Claims, 9 Drawing Figures

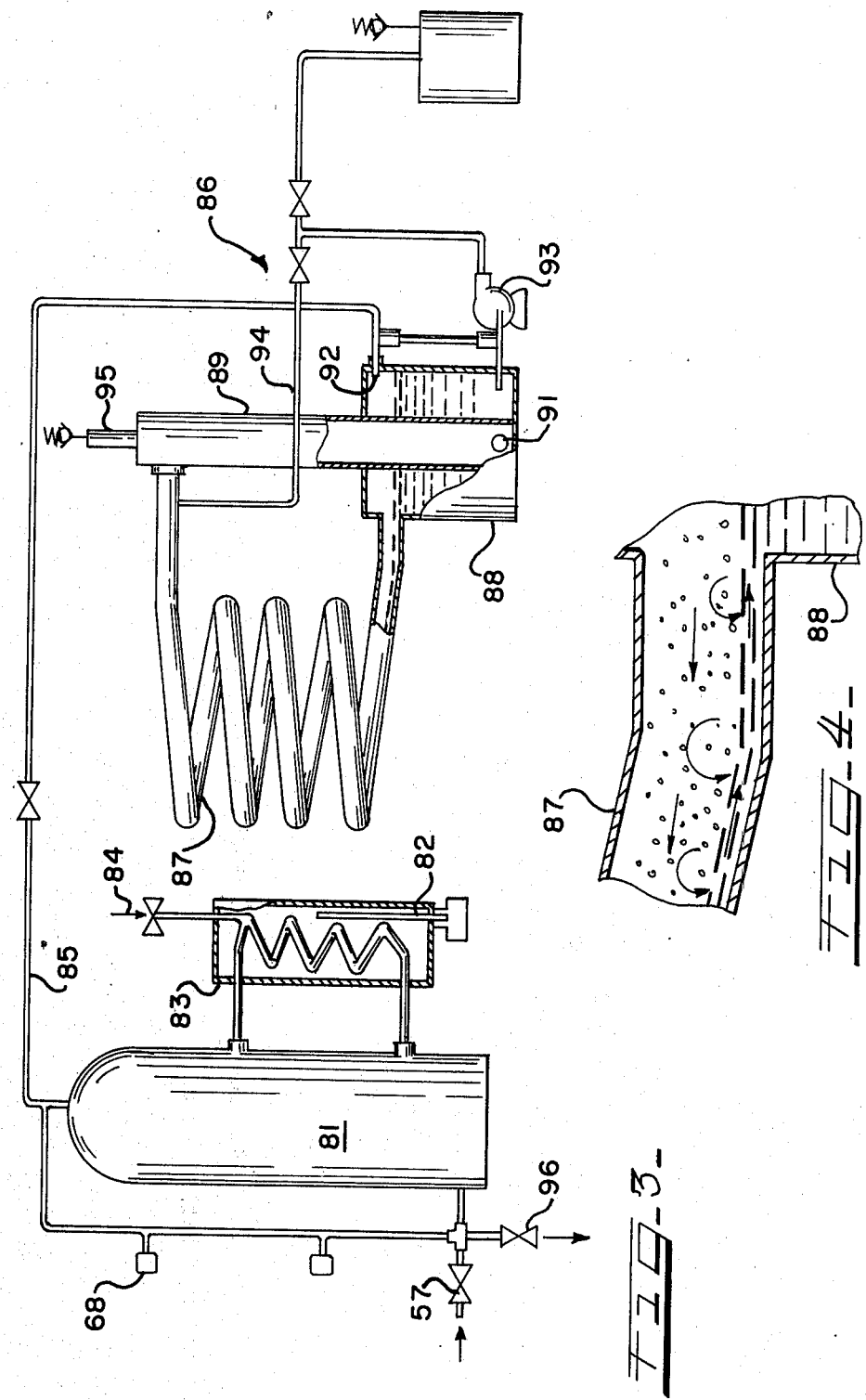

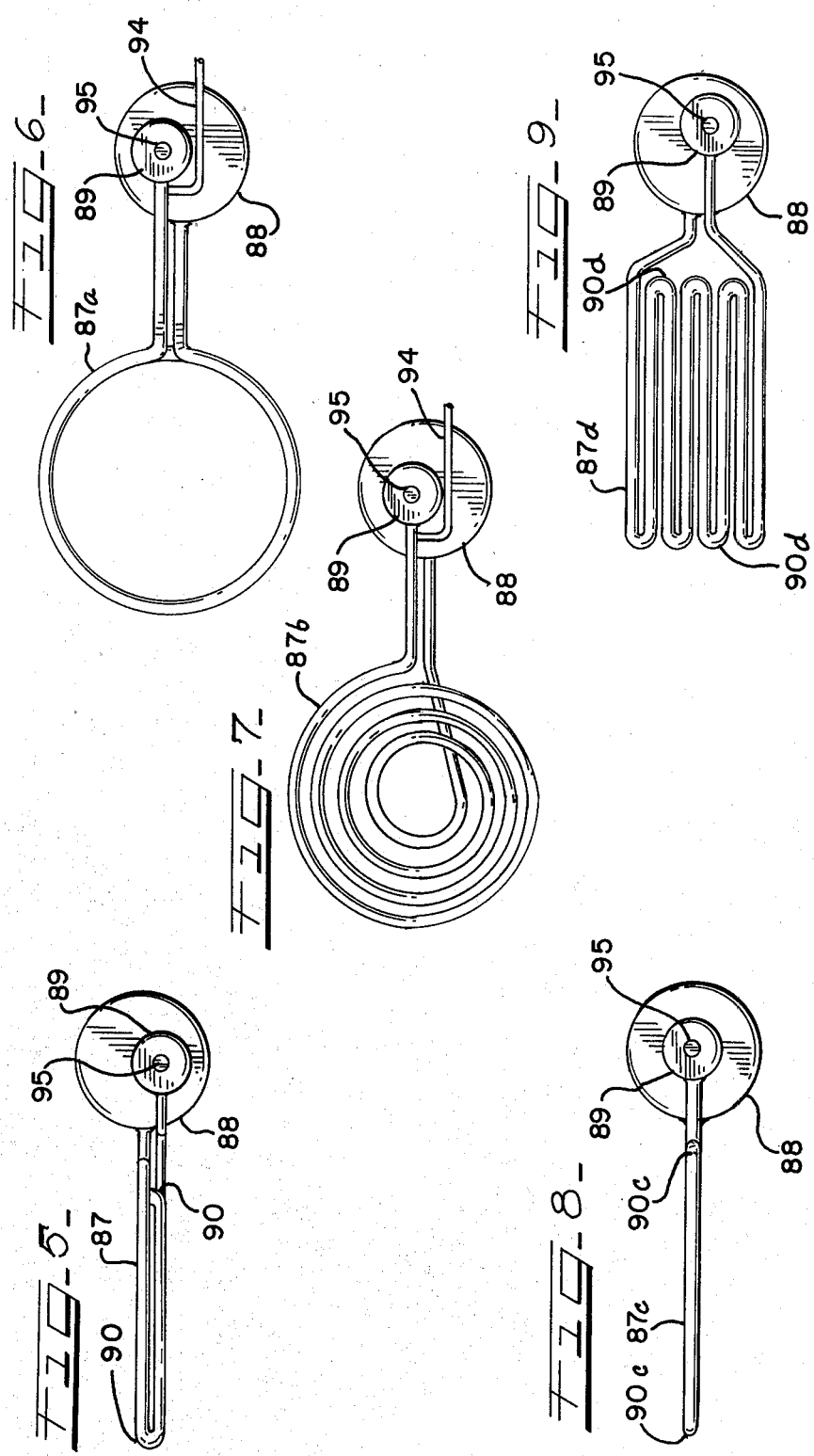

ION EXCHANGE TREATMENT FOR REMOVING TOXIC METALS AND CYANIDE VALUES FROM WASTE WATERS

BACKGROUND AND DESCRIPTION OF THE INVENTION

The present invention generally relates to removal of toxic metal and cyanide values from waste waters. One aspect of the invention relates to treatment by means of a multi-level ion exchange resin bed having a strong base anion exchange resin layer, a weak acid cation exchange resin layer, and a strong acid cation exchange resin layer, and regeneration of such multi-level bed, while another aspect of the invention relates to recovery of cyanide values from acidic waste waters such as those that have been loaded with cyanide values during regeneration of an ion exchange resin bed, the cyanide recovery means including a circulation reactor having an inclined passageway for reacting hydrocyanic gas with a caustic fluid to form and recover cyanide salt. The invention is particularly suitable for treatment of waste waters from commercial plating baths, or other waste waters having a significant concentration of cyanide values, heavy metals, or toxic metals.

Various systems have been devised through the years for the utilization of ion exchange beds to treat waste waters, such as those described in U.S. Pat. No. 2,666,741, No. 3,617,558 and No. 4,009,101. These patents as well as other publications such as U.S. Pat. No. 3,455,819 provide detailed teachings of several approaches that can be taken in regenerating multi-level resin beds containing both cation resin beads and anion resin beads, although such systems tend to develop channeling problems within the resin bed due to uneven or imprecisely controlled flows during the various regeneration steps. Also, these publications do not teach an efficient, on-stream system for removing and recovering cyanide values in a form suitable for re-use within a plating bath.

By the present invention, a multi-layered ion exchange resin bed generally maintains its multi-layered characteristics, with both anionic and cationic resin bead layers remaining within their generally discreet layers, as the bed is in its loading stage and during most phases of its regeneration stage, such being accomplished by sequenced movement of volumes of rinsing liquids, acidic regeneration solutions, basic regeneration solutions, and air in order to control bed disturbance while at the same time thoroughly and rapidly regenerate the multi-layered bed, which bed is particularly well suited for removal of multivalent, especially bi-valent, heavy metal ions as well as cyanide values from plating bath waste streams. In another aspect of this invention, the cyanide containing rinsing streams flowing off of the multi-layered bed are subjected to treatment to react the cyanide values with caustic in order to recover cyanide salt liquor suitable for re-use within a cyanide plating bath.

It is, therefore, a general object of the present invention to provide an improved system for removal of toxic metal and cyanide values from waste waters.

Another object of this invention is an improved ion exchange processing method for efficiently and thoroughly removing multivalent metal values and cyanide values from waste streams of metal plating baths.

Another object of the present invention is an improved ion exchange treatment system having multiple treatment vessels, whereby substantially continuous waste water treatment can be accomplished by taking one or more of the vessels off stream for regeneration while at least one other vessel is treating the waste water flow.

Another object of this invention is an improved system for regenerating a multi-layered ion exchange resin bed including a strong anionic resin as well as both a weak and a strong cationic resin without excessive movement of or extensive damage to the resin beads within the various layers.

Another object of the present invention is an improved apparatus and method for recovering cyanide values within acidic regeneration wastes from ion exchange treatment of waste waters.

Another object of the present invention is an improved method and apparatus whereby cyanide and metal complexes within plating bath wastes are treated first in an ion exchange system to break up the complexes and form hydrocyanic acid, and second in a reactor to remove the hydrocyanic acid from such ion exchange treated wastes in order to recover the cyanide values in the form of cyanide salt.

Another object of the present invention is an improved apparatus and method for reacting gaseous hydrogen cyanide with a caustic solution to form a cyanide salt solution.

These and other objects of the present invention will be apparent from the following detailed description of this invention, including the various aspects thereof, taken in conjunction with the accompanying drawings, wherein:

FIG. 3 is an elevation view, partially broken away, of the preferred cyanide removal unit;

FIG. 4 is a detail view, in cross-section, of a portion of the cyanide removal unit of FIG. 3; and FIGS. 5, 6, 7, 8 and 9 are plan views of alternative embodiment of the removal unit.

Figure 1:
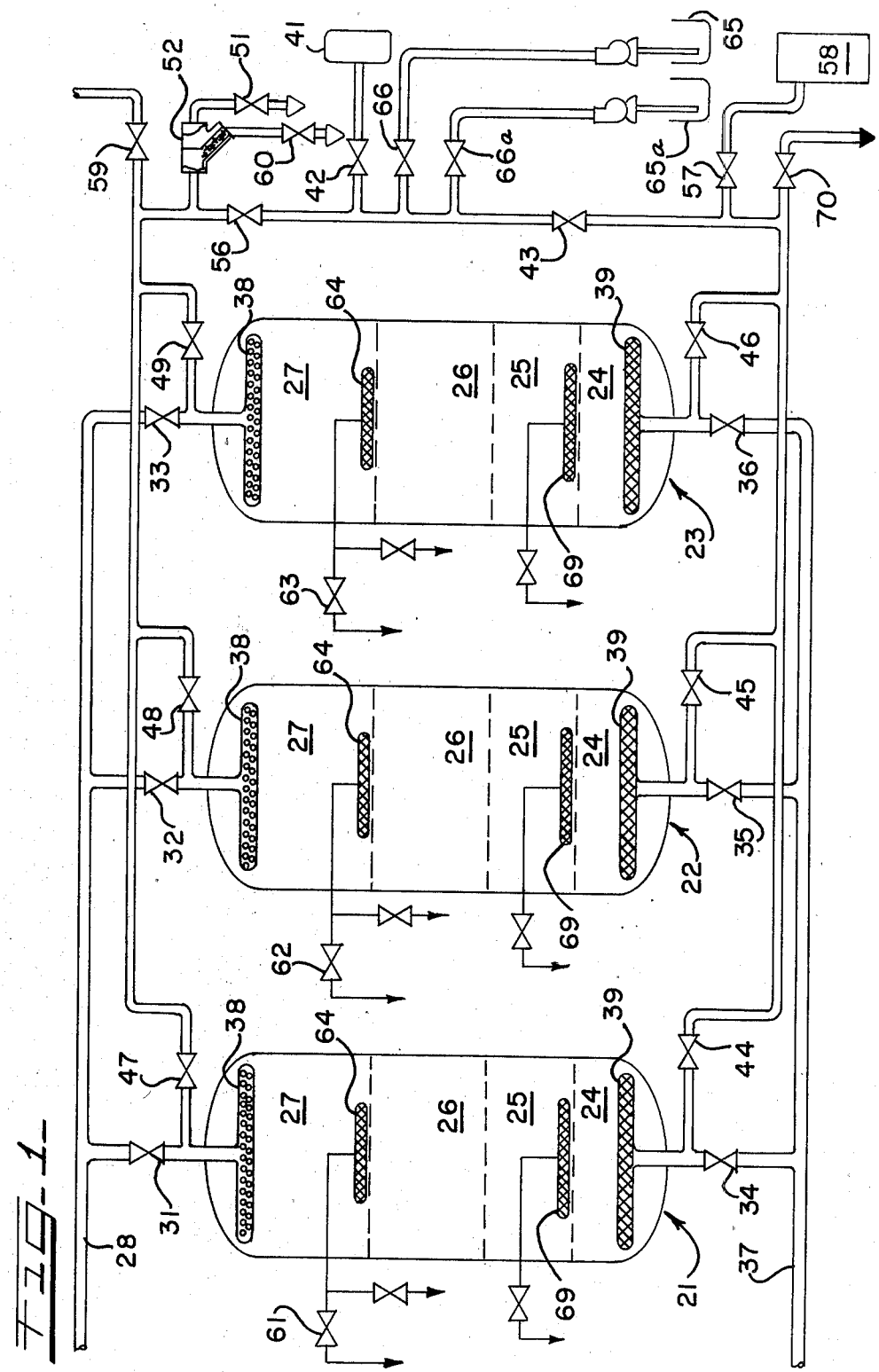
FIG. 1 is a schematic view of the preferred ion exchange treatment battery of vessels for breaking up the metal and cyanide complexes to remove same from a flow of waste water.

At least one ion exchange vessel generally designated 21 is included within the battery of vessels depicted in FIG. 1, which battery includes vessel 21 as well as substantially identical vessels 22 and 23. A multi-layered resin bed is included in each of the vessels of the battery, the preferred multi-level bed including a strong acid cation exchange resin layer 24, a weak acid cation exchange resin layer 25, a strong base anion exchange resin layer 26, as well as a bed expansion volume 27.

Waste water, such as that from a metal plating bath, passes through inlet pipe 28, through one or more of inlet valves 31, 32 or 33, as desired, depending upon which vessel is on-stream to carry the waste water loading and which is off-stream ready for use or being regenerated. This waste water typically contains toxic metals and cyanides, both free and complexed. Whether free or complexed, the toxic metals and cyanides are removed from the waste water loaded through the multi-level ion exchange bed, and the thus purified waste water is passed through outlet valve 34, 35 or 36 and into a treated waste water outlet pipe 37 for recycling, disposal or re-use. Typically, the flow through outlet pipe 37 can still contain monovalent ions, but will be substantially free of heavy metal multivalent ions, cyanides, and complexes thereof.

As each multi-level ion exchange resin bed becomes substantially spent, that particular vessel is moved off-stream for regeneration by closing the appropriate inlet valve, 31, 32 or 33, and outlet valve, 34, 35 or 36, respectively, at which time regeneration can proceed by passing various gasses and liquids into certain portions of the vessel in specific sequences and for preselected lengths of time at selected flow rates. Another of the respective inlet and outlet valves are opened to begin waste water treatment through a freshly regenerated multi-level bed.

To assist in even distribution of the waste water flow, and in order to avoid passage of resin beads out of the vessel 21, the inlet pipe 28 terminates within the vessel 21 into a generally disc-shaped distributor head having a multitude of openings so as to form a foraminous distributor 38. A somewhat similar foraminous distributor 39 is provided within vessel 21 in liquid passing communication with the outlet pipe 37, although typically the aperture size within foraminous distributor 39 will be smaller than that of foraminous distributor 38. To enhance the passage of liquid through distributor 39 while it is embedded within the resin bed, it is preferably of a spider shape having a plurality of arms projecting from a central hub, with the apertures in each of the arms taking the form of slots that are narrower than the resin beads within the bed.

During regeneration, in order that the multi-level resin bed may be expanded somewhat to dislodge small particulate matter and resin fines that may remain after loading, the bed is subjected to a backwashing step, whereby a backwashing liquor, such as softened, demineralized, deionized, tap, or recycled water, is passed through the entire multi-level resin bed in either an upflow or a downflow manner, preferably in an upflow manner, by passage from a backwashing liquor source 41 through opened valve 42 and 43 and one of subsidiary valves 44, 45 or 46, depending upon the particular bed being regenerated, after which the backwashing liquor together with the dislodged matter is passed out of vessel 21, 22 or 23 through valve 47, 48 or 49 and then backwash outlet valve 51. Preferably positioned upstream of backwash outlet valve 51 is a trap or strainer 52 for trapping and removing the larger particulate matter via flush valve 60.

The rate of flow of the backwashing liquor is typically between about 2 and about 4 gallons per minute per square foot of vessel cross-section so as to provide a substantial, but not overly disruptive, flow through the multi-level resin bed. A typical backwashing step would proceed for a time period of about three to six minutes at a pressure of about 20 psi (gauge). By backwashing, the resin bed fluffs up, after which the resin beads will redistribute themselves to their respective levels due to differences in specific gravity among the various bead types within the multi-level resin bed, the heaviest bead type being in the bottom level, and the lightest bead type being in the top level.

Usually, the backwashing liquor, after passing through valve 51 will be stored within a floc tank 53 (FIG. 2), which may contain a level sensor 54 for measuring the volume of backwashing liquor that has passed and for stopping the flow of incoming backwashing liquor when a predetermined volume has entered floc tank 53. An optional acid flowing step can be accomplished at this point by pumping a predetermined quantity of acid from acid holding tank 65 into the multi-level bed and thereafter rinsing until the pH meter 55 of floc tank 53 reaches a predetermined acidic value, on the order of about pH 5, after which the backwashing continues while valve 51 is closed and valves 56, 43 and 57 are opened, thereby passing residual hydrocyanic acid into the cyanide recovery unit, generally designated as 58.

Although not essential, it is preferred to remove residual backwashing liquor from the bed expansion volume 27 in order to reduce the volume of regeneration liquids that must be treated or disposed of and in order to maintain the concentration of the toxic metals and cyanide removed in the regenerating liquids as high as possible. This is accomplished by permitting the resin to settle somewhat, for about 3 to 5 minutes, after which air or some other gas is introduced into the top of the vessel by means of air valve 59, and one of the valves 47, 48 or 49, while at the same time opening drain valve 61, 62 or 63 which opens into the vessel by means of an upper intermediate foraminous collector 64, which is preferably of an external diameter smaller than that of foraminous distributors 38 and 39 in order to avoid extensive flow blockage by collector 64 when valve 61, 62 or 63 is closed.

Next, an acidic regeneration liquid is passed from acid holding tank 65, through acid valve 66, valve 43 and one of valves 44, 45 or 46. Although downflow passage of the acidic regeneration liquid through the bed may be accomplished by opening valve 67 and is easier to carry out and monitor, upflow passage is somewhat more efficient, with exit from the vessel being through foraminous collector 64. The acidic regeneration liquid removes, when present, toxic metals from the spent cation resins and removes cyanides, cyanide complexes and some chromates and di-chromates from the anionic spent resin. The acidic nature of this regeneration liquid also breaks the cyanide complexes to form hydrocyanic acid within the acidic waste stream passing out of the vessel. Preferably, the acidic waste passes to the cyanide recovery unit 58. The desired volume of acidic regeneration liquid passage can be automatically determined by a level sensor 68 within the cyanide recovery unit 58.

As an optional preliminary rinsing step, slightly pressurized air or other gas enters the bed expansion volume 27 of the vessel 21 while generally simultaneously therewith a rinsing liquor such as softened, deionized, demineralized, tap, or recycled water, flows into the resin bed through foraminous distributor 39 and out therefrom through upper intermediate foraminous collector 64. At this stage, the two cationic resins will be in the hydrogen form, while the anionic resin will be in the chloride or sulfate form, depending upon the acidic regeneration liquid utilized; for example, hydrochloric acid regeneration would result in the anionic resin being in the chloride form. The multi-level resin bed at this stage is also substantially free of free acid, with the gentle air flow having been of assistance in stripping free regeneration acid and hydrocyanic acid from the resin bed.

Further rinsing can be accomplished by passing the rinsing liquor throughout the vessel, preferably from foraminous distributor 38 downwardly through the bed and out foraminous distributor 39 for proper disposal through valve 70 or passage to the cyanide recovery unit 58. This step, in addition to removing traces of free regeneration acid and hydrocyanic acid that may remain within the bed, also recompacts the resin bed, with the bed expansion volume 27 being full of air and substantially free of liquid at this stage of the regeneration, although rinse liquid at a depth of a few inches above layer 26 may remain within the resin bed.

Next, the caustic regeneration liquid is pumped into the vessel from the caustic holding tank 65a through caustic valve 66a for the purpose of regenerating the anionic resin to its hydroxyl form and the weak acid cationic resin to its sodium form, while the strong acid cationic resin will remain in its regenerated hydrogen form. The caustic liquid, containing a strong base such as sodium hydroxide, exchanges its hydroxide ion with the anion left by the acidic regenerator, typically a chloride ion, attached to the anionic resin, whereby the solution within the resin voids is a mixture of caustic and sodium chloride, with sodium chloride being the dominant substance in the lower portion of the strong base anion layer 26. This dominant sodium chloride solution, being adjacent to the weak acid cationic resin bed 25, enters thereinto and exchanges with the hydrogen attached to the weak acid cation resin beads, causing hydrogen chloride to form, with the weak acid cationic resin being regenerated to its sodium form.

Although it is preferred that the caustic regeneration liquid flow out of the vessel through a lower intermediate foraminous collector 69, having a structure substantially the same as upper intermediate foraminous collector 64 and located near the bottom of the weak acid cation exchange resin layer, in order to reduce the possibility that caustic will change the character of the previously regenerated strong acid cationic resin layer 24, the fact that hydrogen chloride is formed by the regeneration of the weak acid cationic resin, having this acid contact the regenerated strong acid cationic resin beads will not significantly change their character inasmuch as they had already been regenerated to their hydrogen form.

Thereafter, residual caustic regeneration liquid should be removed from the vessel, which is accomplished by passing rinsing liquid through substantially the same path within the vessel that was taken by the caustic regeneration liquid. In other words, if the caustic regeneration liquid entered the vessel through inlet foraminous distributor 38 and exited through lower intermediate foraminous collector 69, this will be the path taken by the rinsing liquor, which will include passage through the strong base anionic resin bed 26 and the weak acid cationic resin bed 25.

In order that incoming feed passing through the foraminous distributor 38 will not greatly disturb the resin bed, particularly the top layer 26, it is preferred to add rinsing liquor such as water into the bed expansion volume 27. Preferably, this step is taken by upflow passage of water through the vessel from outlet foraminous distributor 39 through inlet foraminous distributor 38, which will assist in rinsing and removal of particulate material or resin fines that may remain within the multi-layered bed after regeneration has been completed. The particular bed treated by this regeneration procedure is now ready to be put on-stream for removal of toxic metals and cyanide values from waste waters.

When the system is used to treat waste water of a chromate plating bath, bisulfite, stored in tank 71, may be added to the caustic regeneration waste liquor within the floc tank 53 and the caustic waste tank 72, in order to reduce the hexavalent chromate to trivalent chromate. In order to enhance the uniformity of the caustic solution, it is possible to intimately mix the waste solution from the caustic regeneration mode with the solution present in the floc tank 53 as well as the caustic waste tank 72, such being accomplished by opening valves 73, 74, 75, 76 and 77 and actuating the pump 78.

Additional waste water treatment steps and may be carried out as desired including treatments with bleach stored within tank 79 and with polymer stored in tank 80, these actual treatments typically being carried out in a sludge treatment station generally designated 97 that includes a previously treated waste water or sludge holding tank 98, one or more tube settlers 99, a dense sludge collector bin 101, a hold tank 102 that may open to sewer through conduit 103 after the waste water therein has been treated with peroxide from tank 104 and with ultra violet source 105.

Figure 2:
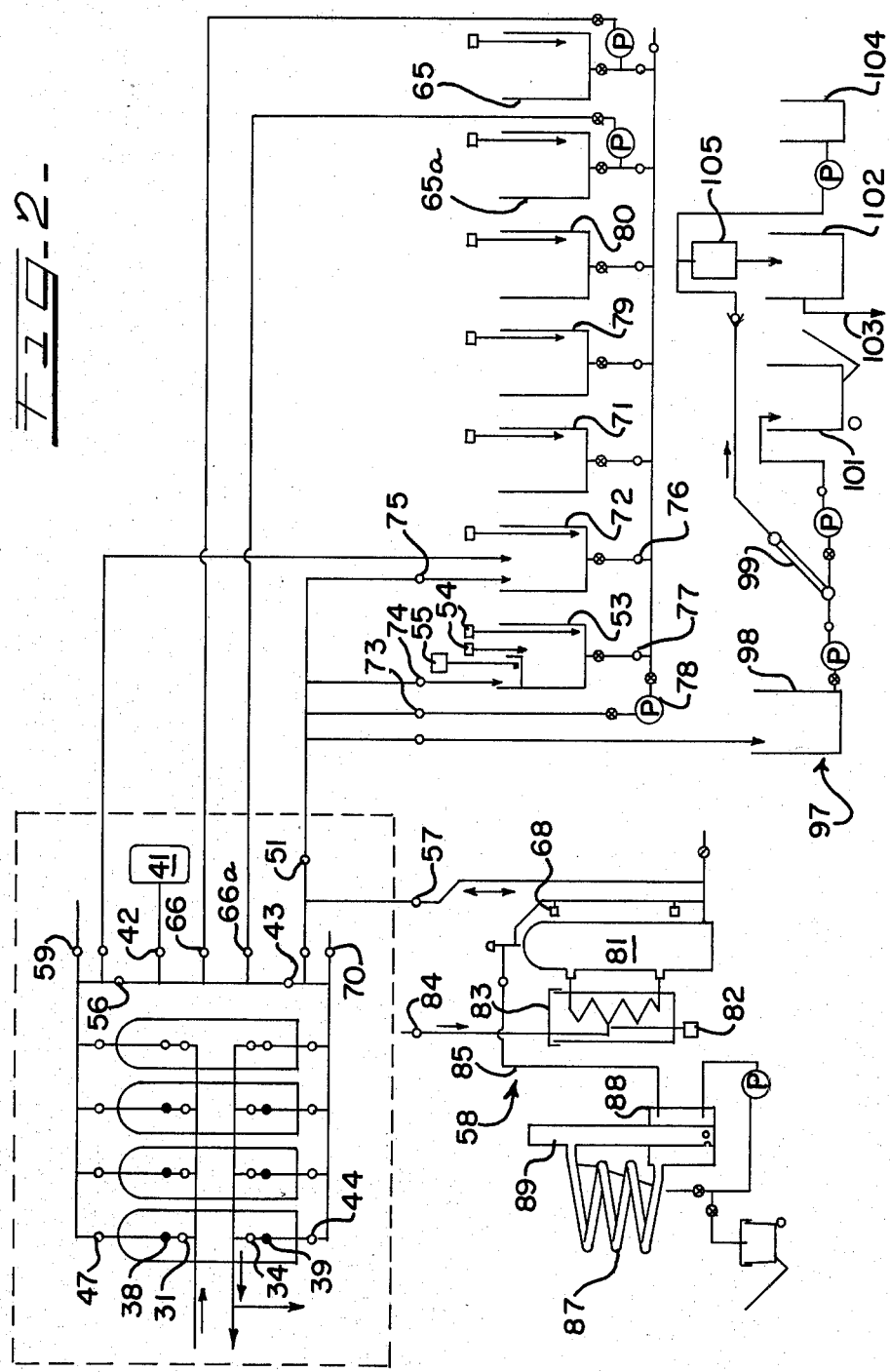
FIG. 2 is a schematic view of the system according to this invention including the ion exchange battery, the cyanide values recovery unit and additional means for removing heavy or toxic metals or salts thereof from the waste flows containing cyanide values.

Further details of the cyanide recovery unit 58 and the method of operation associated therewith are illustrated in FIGS. 2, 3 and 4. The acidic regeneration waste solution flowing through valve 57 flows into a stripper tank 81. Hydrocyanide gas, which had been formed by the action of the acidic regeneration solution upon the heavy metal and cyanide complexes removed from the resin bed within the vessels 21, 22, 23 during the acidic regeneration, is stripped from the waste solution within the tank 82. Hydrocyanide gas stripping is assisted and enhanced by heating the acidic waste solution by means of a heater probe 82 or the like. A convenient way of accomplishing this heating is by flowing the acidic waste solution within stripper tank 81 through a satellite heating tank 83, with flow therethrough being assisted by air or other gas from source 84. The supply of air or gas not only enhances circulation of the waste solution through and between tanks 81 and 83, but it also assists in stripping off the hydrocyanide gas in the form of a mixture of hydrocyanide gas and air from out of stripper tank 81 into gas conduit 85 for passage to the reactor means generally designated as 86.

Reactor means 86 provides a countercurrent reaction interface between the hydrocyanide gas flow and a supply of liquid caustic solution, typically a sodium hydroxide solution, the reactant site being both compact to enhance the reaction, as well as of an extensive length so as to increase reaction time.

The preferred structure of the reactor means 86 illustrated includes a series of interconnected inclined tubes 87, opening at one end into a holding tank 88 and at the other end into an eliminator column 89 which is submerged within the holding tank 88, such eliminator column 89 including at least one orifice 91 to permit a circulation flow of the reactants. The flow or circulation of the hydrocyanide gas and air mixture within the reactor means 86 is from opening 92, upwardly through the circuitous path provided within the series of interconnected tubes 87. At the same time, the liquid caustic solution within tank 88 is caused to circulate through the stripper unit 86 by means of pump 93 which passes the liquid through conduit 94 to near the top of the series of interconnecting tubes 87, after which the liquid flows downwardly through the tubes and returns to the holding tank 88.

As illustrated in FIG. 4, the generally upward flow of gas and the generally downward flow of liquid within the inclined tubes 87 provides a countercurrent impingement situation of a velocity great enough to cause turbulence within the gas as it flows through the inclined tubes 87, which turbulence enhances contact between the gas flow and the liquid caustic solution flowing generally downwardly generally along substantially only the bottom surfaces of the inclined tubes 87.

By this reaction sequence, foaming which would result if a gas were simply bubbled through a solution of caustic, is minimized, which is particularly important for this reaction since the use of anti-foaming agents is, in commercial practice, not possible because the sodium cyanide formed within the reactor is intended to be re-used, and the presence of an anti-foaming agent within a typical plating bath could not be tolerated. A small amount of foam will, nevertheless, be formed, and the stack or eliminator 89 is larger in diameter than the inclined tubes 87 for the purpose of catching spray and the small amount of foam that may form during the counterflow reaction, with the spray and the foam coalescing within the eliminator column 89 to return to the holding tank 88 through the one or more orifices 91. A vent pipe 95 to permit the removal of excess gas enhances the flow characteristics within the reaction means 86.

Initially, the concentration of liquid within the holding tank 88 is on the order of 25 weight percent sodium hydroxide solution, when sodium hydroxide is the caustic material, and circulation and reaction typically continue until the free caustic percent is reduced to about 1 to 2 weight percent of less of sodium hydroxide within the now perdominantly sodium cyanide solution. At this stage, the predominantly sodium cyanide solution is suitable for re-use within a plating bath or the like, the approximate strength of this sodium cyanide being about 3.2 lbs per gallon of solution. Additionally, at this time, the waste solution remaining in the stripper tank 81 is removed therefrom through valve 96 to be subjected to chromate reduction and/or additional waste water treatment steps that may include the addition of materials such as bleach, polymer, peroxide, ultra-violet light and treatment within devices such as holding tanks, tube settlers and collectors.

The preferred structure of the inclined tubes 87 of the reactor means or unit 86 are shown in FIG. 5, and alternative embodiments thereof are illustrated in FIGS. 6, 7, 8 and 9. FIG. 6 depicts an enclosed inclined passageway 87a as a helix of substantially constant diameter that lies generally along a right cylindrical surface, while FIG. 7 shows an enclosed inclined passageway 87b which is a spiraled helix that lies generally along a conical surface. In either case, the caustic liquid flows through conduit 94 and then generally downwardly in a vortex-like manner, while the flow of cyanide-containing gas is in generally upward impingement of the vortex-like downward liquid flow.

FIG. 8 illustrates an embodiment of inclined tubes 87c that is similar to that of FIG. 5 where the individual tubes lie generally along two parallel planes in an alternating manner, the individual tubes in FIG. 8 each lying generally along the same plane. In FIG. 9, the inclined tubes 87d each lie generally along one of a plurality of different planes that are substantially parallel to each other. The structures of FIG. 5, FIG. 8, and FIG. 9 each provide a zig-zag path having enhanced impingement at the various connection points 90, 90c and 90d between each two interconnected inclined tubes.

Whichever actual structure of the inclined tubes of the reactor unit 86 is utilized, the structure is to be one that provides reaction sites that are both compact and elongated.

The following specific examples will more precisely illustrate the invention and teach the procedures presently preferred for practicing the same, as well as the improvements and advantages realized thereby.

EXAMPLE I

A combined waste stream from the rinse waters of a zinc cyanide plating bath and a cadmium cyanide plating bath, which analyzed as 130 ppm zinc, 1.9 ppm chromium, 26 ppm calcium, 26 ppm cadmium and 81 ppm iron before treatment, was clarified within a three-vessel battery as illustrated in FIG. 1 such that the flow through the treated waste water outlet 37 analyzed as 3.0 ppm zinc, no detactable chromium, 0.1 ppm calcium, 1.1 ppm cadmium and 0.2 ppm iron.

The multi-layered bed included a top layer of strong base anion exchange resin of the quaternary ammonium "type 1" variety, known as A-109 (Tradename of Diamond-Shamrock), with the middle layer being a weak acid cation exchange resin of the carboxylic type, known as C-464 (Tradename of Diamond-Shamrock), and the bottom layer being a strong acid cation exchange resin of the nuclear sulfonic type known as C-20 (Tradename of Diamond-Shamrock). In this particular battery, two of the vessels were on stream at one time, with the third bessel being in regeneration, which arrangement was found to be satisfactory for permitting an on-stream cycle of four hours at a contamination level of 50 mg/l. The backwashing was accomplished with city tap water at a flow rate of about 3 gallons per minute per square foot of vessel cross section, which was found suitable to dislodge small particulate matter of 0.01 inch diameter or less, the backwashing step taking about 5 minutes, and this was followed by a hold time of about 4 minutes to permit the bed expansion caused by the backwashing to settle down, after which air at 20 psi gauge entered through inlet distributor 38 until substantially all of the backwash water was removed from the bed expansion volume 27. Hydrochloric acid at a concentration of approximately 20 weight percent was introduced in the acid regenerating step, followed by rinsing at 20 psi gauge and flow of about 3 gallons per minute, at which stage the two cation resins were in their respective hydrogen forms, and the anion resin was in the chloride form. The caustic regeneration liquor was a solution of sodium hydroxide at a concentration approximately 20 weight percent, with the anion resin having been put into the hydroxyl form, the weak acid cationic resin into the sodium form, while the strong acid cationic resin remained in the hydrogen form. The total regeneration time was approximately two hours.

EXAMPLE II

In another run similar to that of Example I, the feed contained 30 ppm zinc, 1.1 ppm chromium, 26 ppm calcium, 12 ppm cadmium and 15 ppm iron, while the treated wastewater was analyzed to contain 0.8 ppm zinc, 0.01 ppm chromium, 0.2 ppm calcium, 0.02 ppm cadmium, and no detectable iron.

EXAMPLE III

Acidic waste streams from the treatment in accordance with Examples I and II were passed to a cyanide recovery unit as illustrated in FIG. 3, the particular unit having a stripper tank 81 with a capacity of about one hundred gallons.

When the heater probe raised the temperature within the stripper tank to 180° F., at least about 80 percent of the hydrocyanide gas was removed, while raising the temperature to about 200° F. removed substantially all of the hydrocyanide gas during a period of about one hour. After this one hour period, the stripper tank 81 was drained for subsequent removal of heavy metals.

The caustic solution within the holding tank 88 was initially a 25 weight percent solution of sodium hydroxide, and it was pumped at a flow rate of about 1½ gallon per minute. The gaseous flow through the reactor means 86 was provided by a flow of air of about 1 cubic foot per minute. After the reaction had proceeded for about one hour, the concentration of free sodium hydroxide therewithin was reduced to about 1.5 weight percent, at which stage the sodium cyanide solution thus formed was suitable for re-use within the plating bath, it having a strength of sodium cyanide of about 3.2 pounds per gallon.

EXAMPLE IV

Barren liquor from a cyanide gold leaching facility was processed through a single multi-level ion exchange bed within a single vessel as illustrated in FIG. 1, the bed containing one hundred parts of strong base anionic resin on top of fifty parts of weak acid cationic resin which was on top of fity parts of strong acid cationic resin, the liquor being analyzed as containing 85 ppm calcium, 136 ppm $Cu(CN)_4^{-3}$ 180 ppm $Zn(CN)_5^{-3}$, 6.3 ppm $Ni(CN)_4^{-2}$, 0.5 ppm cadmium and 750 ppm cyanide ion. Numerous bed volumes thereof were passed therethrough, selected after-treatment analyses being reported in the Table:

TABLE

| Cyanide | Zinc | Copper |
| --- | --- | --- |
| 1.0 ppm | 0 ppm | 0.8 ppm |
| 0.75 ppm | 0 ppm | 0.4 ppm |
| 1.0 ppm | 0 ppm | 0.7 ppm |
| 1.0 ppm | 0 ppm | 0.3 ppm |
| 2.0 ppm | 0 ppm | 0.3 ppm |
| 2.0 ppm | 0 ppm | 0.2 ppm |
| 0.5 ppm | 0 ppm | — |
| 0.5 ppm | 0.8 ppm | — |
| 0.5 ppm | 0.14 ppm | — |
| 0.5 ppm | 0 ppm | — |
| 1.0 ppm | 0 ppm | 0.42 ppm |
| 2.5 ppm | 0 ppm | 1.07 ppm |
| 7.5 ppm | 0 ppm | 0.21 ppm |
| 7.5 ppm | 0 ppm | 0.38 ppm |
| 7.5 ppm | 0 ppm | 0.17 ppm |
| — | 0 ppm | 0.23 ppm |
| 0.5 ppm | 0 ppm | 0.42 ppm |
| 1.0 ppm | 0 ppm | 1.07 ppm |

It will be apparent to those skilled in this art that the present invention can be embodied in various forms; accordingly, this invention is to be construed and limited only by the scope of the appended claims.

I claim:

1. Apparatus for removing toxic metals and for recovering cyanide values from waste waters, comprising:
   a generally closed ion exchange vessel having a multi-level ion exchange resin bed and a plurality of foraminous members therewithin;
   a waste water inlet pipe communicating with the uppermost of said foraminous members;
   a treated waste water outlet pipe communicating with the lowermost of said foraminous members;
   an upper outlet pipe communicating with an upper intermediate one of said foraminous members located generally below said uppermost foraminous member and above said lowermost foraminous member;
   a lower outlet pipe communicating with a lower intermediate one of said foraminous members located generally below said upper intermediate foraminous member;
   means for injecting an aqueous backwashing liquor into the ion exchange vessel through one or more of said foramious members;
   means for injecting an acidic regeneration liquor into the ion exchange vessel and through the multi-level ion exchange resin bed;
   means for injecting a caustic regeneration liquor into the ion exchange vessel and through at least a portion of the multi-level resin bed;
   means for injecting a pressurized fluid into the ion exchange resin bed through one of said foraminous members;
   a cyanide recovery unit including a tank in liquid passing communication with at least one of said outlet pipes, said tank including a heating means for driving off hydrocyanic gas from acidic waste regeneration liquid removed from the ion exchange vessel, said tank further including exit means for removing waste water containing toxic metals from said tank;
   a reactor means having a holding tank in recirculating communication with an inclined, closed passageway;
   conduit means for passing the hydrocyanic gas from the tank into said reactor means and generally upwardly in said inclined passageway;
   means for circulating caustic fluid from said holding tank generally downwardly through said inclined closed passageway; and
   exit conduit means for recovering cyanide salt formed within said reactor means.

2. The apparatus of claim 1, further including a plurality of said generally closed ion exchange vessels in alternating valved communication with the waste water inlet and outlet pipes, whereby at least one of said vessels is on stream for waste water treatment while at least another one of said vessels is off stream for regeneration thereof.

3. The apparatus of claim 1, wherein said multi-level ion exchange resin bed includes, in order of ascending height, a strong acid cation exchange resin layer, a weak acid cation exchange resin layer and a strong base anion exchange resin layer, and wherein said vessel further includes a bed expansion volume above said multi-level bed.

4. The apparatus of claim 3, wherein said lower intermediate foraminous member is located near the bottom of said weak acid cation exchange resin layer.

5. The apparatus of claim 3, wherein said upper intermediate foraminous member is located within the bed expansion volume.

6. The apparatus of claim 3, wherein said uppermost foraminous member is within the bed expansion volume.

7. The apparatus of claim 3, wherein said lowermost foraminous member is located within said strong acid cation exchange resin layer.

8. The apparatus of claim 1, wherein said inclined passageway includes a series of interconnected inclined tubes opening at one end thereof into the reactor holding tank and at the other end thereof into a column in fluid passing communication with the reactor holding tank.

9. A method for the ion exchange treatment of waste water, comprising:
flowing a feed waste water through a multi-level ion exchange resin bed having a strong base anion exchange resin layer, a weak acid cation exchange resin layer and a strong acid cation exchange resin layer; and
regenerating said multi-level ion exchange resin bed by the steps of:
(a) backwashing said multi-level bed by passing a rinse liquid through said multi-level bed and a bed expansion volume to form a liquid layer;
(b) passing an acidic regeneration fluid through said multi-level bed;
(c) flowing a pressurized gas into said bed expansion volume while generally concurrently flowing a rinse liquid through said multi-level bed to remove acidic regeneration fluid from said multi-level bed;
(d) removing residual acidic regeneration fluid from said bed by flowing a rinse liquid through said multi-level bed in a direction generally opposite to that of said generally concurrent flow of pressurized gas;
(e) passing a caustic regeneration fluid through at least said strong base anion resin layer and said weak acid cation resin layer; and
(f) flowing a rinse liquid through at least said strong base anion resin layer and said weak acid cation resin layer.

10. The method of claim 9, wherein said backwashing flows upwardly throughout substantially the entire multi-level bed to expand the bed and remove particulate matter from the bed intersticies.

11. The method of claim 9, wherein said backwashing step includes flowing an acid solution through substantially the entire multi-level bed and to a cyanide recovery unit for reacting hydrocyanic acid with caustic.

12. The method of claim 9, wherein a flow of pressurized gas enters the multi-level ion-exchange resin bed and removes liquid from the bed expansion after said backwashing step (a) and before said acidic regeneration passing step (b).

13. The method of claim 9, wherein said step (d) of removing residual acidic regeneration fluid flows the rinse liquid downwardly through substantially the entire multi-level bed.

14. The method of claim 9, wherein said step (e) of passing a caustic regeneration fluid and said step (f) of flowing rinse liquid substantially avoids passage thereof through the strong acid cation exchange resin layer.

15. The method of claim 9, wherein a layer of rinse liquor is within the bed expansion volume when the regenerating steps are completed and before subsequent flowing of feed waste water commences.

16. The method of claim 9, further including removing and recovering cyanide values from the acidic regeneration fluid flows out of the multi-level bed by the steps including:
heating the acidic regeneration fluid flows to drive off hydrocyanide gas therefrom;
directing the driven off hydrocyanide gas into a reactor means having a caustic fluid therewithin;
circulating said caustic fluid through the reactor means into and through an inclined, enclosed path, the caustic fluid flowing generally downwardly while within the inclined path;
circulating said hydrocyanide gas through at least a portion of said reactor means into and through said inclined closed path, the hydrocyanide gas flowing generally upwardly while within the inclined path;
whereby said caustic fluid and said hydrocyanide gas react with each other during their respective circulation steps to form a cyanide salt compound; and
recovering said cyanide salt compound.

17. Apparatus for removing cyanide values from acidic waste water, comprising:
a stripper tank having heating means for driving off hydrocyanic gas from waste water including acid cyanide values therewithin;
a reactor means having circulation between a holding tank and an inclined, closed passageway, said inclined closed passageway being both compact and elongated by including an inclined tube having a series of interconnected vertical levels;
conduit means for passing said hydrocyanide gas from said stripper tank into said reactor means and generally upwardly within said inclined passageway;
a column in fluid passing communication with the reactor holding tank, said inclined, closed passageway opening at one end thereof into said reactor holding tank and at the other end thereof into said column;
means for circulating caustic fluid from said holding tank of the reactor means and generally downwardly within said inclined passageway and back to said holding tank generally countercurrently of said hydrocyanide gas flow therewithin to form a cyanide salt compound; and
exit conduit means for removing said cyanide salt compound from said circulating reactor.

18. The removing apparatus of claim 17, further including a source of pressurized air opening into a waste water circulation conduit within said stripper tank.

19. The removing apparatus of claim 17, wherein said opening of the inclined closed passageway into said column is into an upper passageway of the column, said column having at least one orifice opening into said holding tank below the surface of said caustic fluid.

20. The removing apparatus of claim 17, wherein said inclined closed passageway has the general configuration of a helix.

21. The removing apparatus of claim 17, wherein said inclined closed passageway has the general configuration of a helix of substantially constant diameter throughout its height.

22. The removing apparatus of claim 17, wherein said inclined closed passageway is a series of generally straight enclosed passageways that lie along planes generally parallel to each other.

23. The removing apparatus of claim 17, wherein said inclined passageway is a series of generally straight enclosed passageways that lie generally along a single plane.

24. A method for removing cyanide values from acidic waste waters, comprising:
heating a cyanide-containing waste water to drive off hydrocyanide gas therefrom;

directing the driven off hydrocyanide gas into a reactor means having a caustic fluid therewithin;

circulating said caustic fluid through the reactor means into and through an inclined, enclosed path, the caustic fluid flowing generally downwardly while within the inclined path, said inclined path being both compact and elongated by including a series of interconnected vertical levels;

circulating said hydrocyanide gas through at least a portion of said reactor means into and through said inclined closed path, the hydrocyanide gas flowing generally upwardly while within the inclined path, said generally upward flowing of hydrocyanide gas within the inclined path and said generally downward flowing of the caustic fluid within the inclined path combining to provide countercurrent impingement and turbulence between the hydrocyanide gas and the caustic fluid, which countercurrent impingement and turbulence minimizes foaming between the hydrocyanide gas and the caustic fluid;

whereby said caustic fluid and said hydrocyanide gas react with each other during their respective circulation steps to form a cyanide salt compound while minimizing foaming during the reaction; and recovering the cyanide salt compounds.

25. The removing method of claim 24, further including adding a flow of air into the flow of hydrocyanide gas.

26. The removing method of claim 24, further including adding a flow of air into said cyanide-containing waste water during said heating thereof.

27. The removing method of claim 24, wherein said circulating of hydrocyanide gas in the reactor means is assisted by and includes a pressurized air supply.

28. The removing method of claim 24, wherein said step of directing the hydrocyanide gas into the reactor means directs the gas above the level of the caustic fluid within a holding tank of the reactor means.

29. The removing method of claim 24, wherein said inclined closed path is a helix.

30. The removing method of claim 24, wherein said inclined path is a helix of substantially constant diameter throughout its height.

31. The removing method of claim 24, wherein said inclined path is a series of generally straight enclosed interconnected passageways that lie along planes generally parallel to each other.

32. The removing method of claim 24, wherein said caustic is a sodium hydroxide solution and said cyanide salt is a sodium cyanide solution.

* * * * *

UNITED STATES PATENT AND TRADEMARK OFFICE
CERTIFICATE OF CORRECTION

PATENT NO. : 4,321,145

DATED : March 23, 1982

INVENTOR(S) : Lee G. Carlson

It is certified that error appears in the above–identified patent and that said Letters Patent are hereby corrected as shown below:

Column 2, line 48, "embodiment" should read --embodiments--.

Column 6, line 8, delete "and".

Column 6, line 28, "82" should read --81--.

Column 7, line 30, "of" should read --or--.

Column 8, line 16, "detactable" should read --detectable--.

Column 8, line 29, "bessel" should read --vessel--.

Column 11, line 18, "liquid" should read --liquor--.

Signed and Sealed this

Eighth Day of June 1982

[SEAL]

Attest:

Attesting Officer

GERALD J. MOSSINGHOFF

Commissioner of Patents and Trademarks